United States Patent [19]
Aidman et al.

[11] Patent Number: 5,376,477
[45] Date of Patent: Dec. 27, 1994

[54] STORAGE BATTERY AND PLATE SEPARATOR SYSTEMS FOR A STORAGE BATTERY

[75] Inventors: Eugene I. Aidman; Galina Aidman, both of Redlands; Joseph A. Orsino, San Clemente; John E. James, Redlands, all of Calif.

[73] Assignee: Teledyne Industries, Inc., Los Angeles, Calif.

[21] Appl. No.: 231,890

[22] Filed: Apr. 22, 1994

Related U.S. Application Data

[63] Continuation of Ser. No. 974,102, Nov. 10, 1992, abandoned.

[51] Int. Cl.$^5$ ............................................. H01M 4/56
[52] U.S. Cl. ..................................... 429/141; 429/142; 429/144; 429/225; 429/228
[58] Field of Search ................. 429/141, 144, 142, 225, 429/228

[56] References Cited

U.S. PATENT DOCUMENTS

| | | | |
|---|---|---|---|
| 3,787,240 | 1/1974 | Gillman et al. | 136/30 |
| 4,234,623 | 11/1980 | Moshtev et al. | 427/54.1 |
| 4,301,219 | 11/1981 | Kosuga | 429/57 |
| 4,650,730 | 3/1987 | Lundquist et al. | 429/62 |

FOREIGN PATENT DOCUMENTS

| | | |
|---|---|---|
| 3005297 | 8/1981 | Germany. |
| 0010737 | 1/1980 | Japan. |

*Primary Examiner*—Prince Willis, Jr.
*Assistant Examiner*—M. Nuzzolillo

[57] ABSTRACT

A battery-plate separator system includes three layers in face-to-face relationship, the first and third layers including a porous mat of randomly oriented fibers, and, between the first and third layers, a second layer comprising a porous organic polymeric sheet with tortuosity and pores sufficiently small to substantially block penetration by metallic particles. A storage battery includes a plurality of positive lead peroxide electrodes, a plurality of negative metallic lead electrodes, and the same three-layer separator system in a closed case with a body of electrolyte to which the system is inert, that is absorbed by the separator system, and that is maintained in contact with the electrodes.

5 Claims, 1 Drawing Sheet

STORAGE BATTERY AND PLATE SEPARATOR SYSTEMS FOR A STORAGE BATTERY

This application is a continuation of pending prior application Ser. No. 07/974,102 filed Nov. 10, 1992, now abandoned.

BACKGROUND OF THE INVENTION

Field of the Invention

This invention relates to storage batteries, particularly lead-acid storage batteries, to plate separator systems for such batteries, and to methods for producing such batteries and battery separator systems.

BRIEF DESCRIPTION OF THE PRIOR ART

U.S. Pat. Nos. 3,362,861 and 3,159,508 disclose recombinant batteries. U.S. Pat. No. 4,465,748 discloses a separator for recombinant battery plates made of glass fibers of a plurality of diameters or from mixtures of glass fibers and polypropylene fibers. U.S. Pat. No. 4,216,280 discloses glass fiber sheet material used as a plate separator in such a battery. U.S. Pat. No. 4,373,015 discloses sheet material for use as a separator in such a battery in which the sheet material includes short staple fiber polyester matting.

Sheet separators for use in non-recombinant batteries that include glass fibers and organic fibers appear in U.S. Pat. Nos. 4,529,677; 4,363,856; 4,359,511; and 4,367,271. Japanese Patent Document 55/146872 discloses a battery separator material comprising glass and organic fibers. U.S. Pat. No. 4,245,013 discloses a battery plate separator that includes a first sheet of fibrous material and polyethylene fibers, and a second sheet of fibrous material including polyethylene and a synthetic pulp count higher than in the first sheet.

None of these separators works well in storage batteries, and in particular in lead-acid batteries that are substantially acid limited and operate in acid-starved condition.

SUMMARY OF THE INVENTION

This invention relates to battery plate separator systems for use in storage batteries, and in particular for use in recombinant lead-acid batteries, that comprise at least three layers in each system. The first and third layers comprise porous mats made of randomly oriented, preferably non-woven, fibers. These fibers are made of glass and/or of an organic polymeric material such as polyethylene or polypropylene. These mats preferably have a porosity of at least about 90%.

The second layer in this separator system, which lies between the first and third layers, comprises a porous organic polymeric sheet. Preferably, this sheet is made of a thermoplastic polymer such as polyvinyl chloride, or a polyolefin such as polyethylene or polypropylene. This sheet preferably has a porosity in the range of about 50% to about 65%, and more preferably about 60%. This sheet preferably has tortuosity and pores with a pore size sufficiently small to block passage of lead dendrites.

Each of these three layers preferably also has a thickness sufficient to provide a storage battery, at a desired electrolyte saturation of separator pores, with a desired amount of the electrolyte.

The invention also relates to storage batteries, such as recombinant lead-acid batteries, that include a plurality of positive and negative electrodes, such as lead peroxide and lead electrodes, in a closed case; the new battery plate separator system placed between adjacent electrodes; and an electrolyte to which the separator system is inert, but that is absorbed by the pores of the active materials and separators, and is maintained in contact with adjacent electrodes in the battery.

The invention also comprises methods for producing storage batteries, especially recombinant lead-acid batteries, that include the steps of assembling a plurality of electrodes with the battery plate separator systems of this invention between adjacent electrodes in a case having an opening in at least one wall of the case; introducing into the case sufficient electrolyte to cover the electrodes; if desired, removing electrolyte that is not absorbed by the separators, plates, or other internal surfaces that are wetted by the electrolyte; and closing the case. If desired, the case can be partially evacuated before the electrolyte is introduced.

DESCRIPTION OF THE PREFERRED EMBODIMENTS

Figure 1:
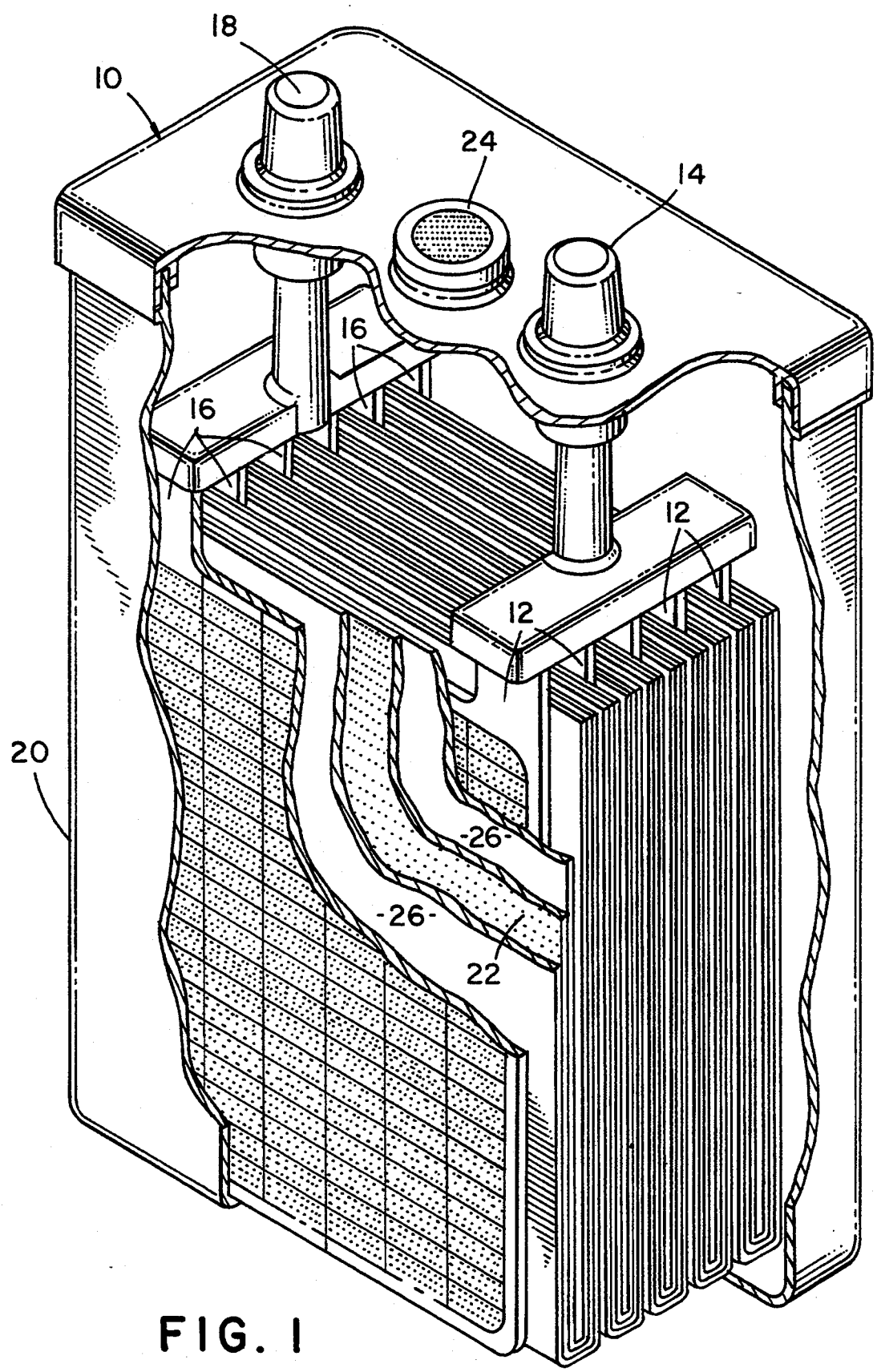
FIG. 1 shows a perspective view, partially broken away, of a battery including the preferred embodiment of the plate separator system of this invention.

Referring to the drawing, a single cell battery 10 includes a plurality of positive plates 12 that are electrically connected to a positive terminal 14, and a plurality of negative plates 16 electrically connected to negative terminal 18. Plates 12 and 16 are housed within battery case 20. Boss 24 defines an opening in the top surface of case 20. Between the plates is the separator system of this invention comprising first and third layers 26. Each of layers 26 is a porous mat made of randomly-oriented, non-woven fibers. Between the first and third layers is a second layer 22 comprising a porous organic polymeric sheet. In one embodiment, this three-layered separator system can be wrapped around all plates of the same polarity in the battery. Alternatively, a part of the separator system can be wrapped around each of the negative plates, and the rest of the system around each of the positive plates.

A preferred method for producing the battery depicted in FIG. 1 comprises the steps of filling battery case 20 containing dry charged or unformed plates 12 and 16 and the separator system with a quantity of electrolyte sufficient to flood the case and the separators, forming the battery 10 by charging, if the plates are unformed, and then sealing battery case 20 by inserting a cap (not shown) into the opening defined by boss 24 to close battery 10.

The invention may be better understood from the following examples, which are presented solely for illustrative purposes.

EXAMPLE 1

Two batteries, denoted A and B, were made with 17 electrodes each. Each battery included 8 positive pasted plates made of lead peroxide and 9 negative pasted plates made of metallic lead. Each of these plates had a length of 4.25 inches, a height of 5.25 inches, and a thickness of 0.05 inch. Three-layer battery separators were made from two porous fibrous mats having a length of 10.75 inches, a width of 4.75 inches, and a thickness of 0.013 inch, and, between these two, a flat porous thermoplastic sheet measuring 10.75 inches in length, 4.75 inches in width, and 0.010 inch in thickness. This separator system was wrapped around adjacent plates in the battery. In particular, each of the positive plates was wrapped with one of the porous fibrous mats folded around the bottom of the plates. Each of the negative plates was first wrapped with one of the porous fibrous mats, and then with a sheet of the porous thermoplastic material around the bottom of the plates. The porous non-woven fibrous mats were made of glass fibers. The flat sheets of porous thermoplastic material were made of polyethylene.

Two additional batteries, denoted C and D, were made which differed from the first two batteries in that each separator system contained only one porous fibrous mat having a thickness of 0.026 inch, instead of two layers of 0.013 inch each. One fibrous mat was wrapped around each of the positive plates, and one sheet of porous polyethylene sheet was wrapped around each of the negative plates. In all other respects, batteries C and D were identical to the batteries A and B.

All four of these batteries, A, B C, and D, were subjected to the same internal compression during the course of the testing. Each of the batteries contained the same electrolyte, namely sulfuric acid solution. Each was conditioned electrically, characterized, and sealed in the same way. Tests on these batteries produced the data set forth in Table I:

TABLE I

| DISCHARGE RATE (Amperes) | CAPACITY (Ampere-Hours) @ 100% DoD (DoD = Depth of Discharge; 100% DoD = Discharge to Final Voltage of 1.50 Volts Per Cell) | | | |
|---|---|---|---|---|
| | A | B | C | D |
| 30 | 27.62 | 29.68 | 28.16 | 31.01 |
| 30 | 30.44 | 32.84 | 31.43 | 32.52 |
| 30 | 30.54 | 32.81 | 30.77 | 32.48 |
| 30 | 31.11 | | 31.25 | 28.55 |
| 30 | 31.32 | | | |
| 60 | | 28.49 | 26.67 | 28.55 |

Each of the cells was also subjected to a continuous life cycle test that included the following three-step cycle: (a) discharging at thirty amperes for one hour; (b) charging at 2.35 volts per cell for four hours; and (c) resting, in open circuit condition, for one hour. During the charging, the current was limited to 100 amperes. In these tests, a cell failed, when, during discharge, the cell voltage reached 1.50 volts within 1 hour. The results of these life cycle tests appear in Table II below:

TABLE II

| BATTERY NO. | CYCLE NO. BEFORE BATTERY FAILURE |
|---|---|
| A | 97[1] |
| B | 101[2] |
| C | 18 |
| D | 17 |

[1] - After cycle 65, restrainers were removed
- On cycle 97, final discharge voltage was 1.84 V.
[2] - After cycle 55, restrainers were reinstalled
- On cycle 101, final discharge voltage was 1.87 V.

What is claimed is:

1. A battery plate separator system having a size and shape adequate to absorb and maintain electrolyte in contact with adjacent electrodes in a lead-acid recombinant storage battery, and to substantially completely separate all electrodes in said battery from one another comprising at least three layers in face to face relationship, the first and third layers comprising a porous fibrous mat wherein the fibers are made of a material selected from the group consisting of glass and organic polymers, and are randomly oriented, each of said mats having a porosity greater than 90% and being inert to an aqueous electrolyte, when said electrolyte is surfactant free, said first and third layers maintaining said electrolyte substantially continuously in contact with said electrodes in said lead-acid recombinant storage battery and, between said first and said third layers, a second layer comprising a porous organic polymeric sheet with a porosity in the range of about 50% to about 65%, said porous organic polymeric sheet being hydrophobic to said electrolyte, and having tortuosity and pores sufficiently small to substantially block penetration by metallic particulates that could attach to and grow on the negative plates of a battery during charging of said battery.

2. The battery plate separator system of claim 1 wherein each of said porous fibrous mats and said porous organic polymeric sheet has a thickness and porosity sufficient to provide a storage battery at a desired electrolyte saturation of separator pores with a desired amount of electrolyte.

3. A lead-acid recombinant storage battery comprising a plurality of positive lead peroxide electrodes and a plurality of negative metallic lead electrodes in a closed case, and between each of said electrodes, and substantially completely separating each of said electrodes from one another, a three-layer separator system between adjacent ones of said electrodes, and a body of an electrolyte to which the separators are inert when said electrolyte is surfactant free, and which is absorbed by said separator system and is maintained in contact with each of the adjacent ones of said electrodes, said separator system comprising at least three layers in face-to-face relationship, the first and third layers comprising a porous mat wherein the fibers are made of a material selected from the group consisting of glass and organic polymers, and are randomly oriented, each of said mats having a porosity greater than 90% and being inert to an aqueous electrolyte, when said electrolyte is surfactant free, and, between said first and said third layers, a second layer comprising a porous organic polymeric sheet with a porosity in the range of about 50% to about 65%, said porous organic polymeric sheet being hydrophobic to said electrolyte, and having tortuosity and pores sufficiently small to substantially block penetration by metallic particulates that could attach to and grow on the negative plates of said battery during charging of said battery.

4. The storage battery of claim 3 wherein each of said porous fibrous mats and said porous organic polymeric sheet has a thickness and porosity sufficient to provide said storage battery at a desired electrolyte saturation of separator pores with a desired amount of said electrolyte.

5. A method of making a recombinant storage battery, said method including the steps of assembling a plurality of positive electrodes comprising lead peroxide and a plurality of negative electrodes comprising metallic lead with a separator system between adjacent ones of each of the electrodes in a case having an opening in at least one wall, introducing into said case a quantity of an electrolyte sufficient to cover the electrodes, and to flood the case, charging said battery, as necessary, removing from said case electrolyte unabsorbed by said separators and said plates, and closing the case, said separator system having a size and shape sufficient to substantially completely separate each of said electrodes from one another in said case and to absorb and maintain said electrolyte in contact with adjacent electrodes in said battery comprising at least three layers in face-to-face relationship, the first and third layers comprising a porous mat wherein the fibers are made of a material selected from the group consisting of glass and organic polymers, and are randomly oriented, each of said mats having a porosity greater than 90% and being inert to an aqueous electrolyte, when said electrolyte is surfactant free, and, between said first and said third layers, a second layer comprising a porous organic polymeric sheet with a porosity in the range of about 50% to about 65%, said porous organic polymeric sheet being hydrophobic to said electrolyte, and having tortuosity and pores sufficiently small to substantially block penetration by metallic particulates that could attach to and grow on the negative plates of said battery during charging of said battery.

* * * * *